US012110129B2

(12) United States Patent
Lee et al.

(10) Patent No.: US 12,110,129 B2
(45) Date of Patent: Oct. 8, 2024

(54) AUTONOMOUS LANDING SYSTEMS AND METHODS FOR VERTICAL LANDING AIRCRAFT

(71) Applicant: The Texas A&M University System, College Station, TX (US)

(72) Inventors: Bochan Lee, College Station, TX (US); Moble Benedict, College Station, TX (US)

(73) Assignee: The Texas A&M University System, College Station, TX (US)

( * ) Notice: Subject to any disclaimer, the term of this patent is extended or adjusted under 35 U.S.C. 154(b) by 87 days.

(21) Appl. No.: 17/180,326

(22) Filed: Feb. 19, 2021

(65) Prior Publication Data
US 2022/0017235 A1    Jan. 20, 2022

Related U.S. Application Data

(60) Provisional application No. 62/978,458, filed on Feb. 19, 2020.

(51) Int. Cl.
*B64D 45/00* (2006.01)
*B64D 45/08* (2006.01)
(Continued)

(52) U.S. Cl.
CPC ............. *B64D 45/08* (2013.01); *B64D 47/08* (2013.01); *G05D 1/106* (2019.05); *G08G 5/025* (2013.01)

(58) Field of Classification Search
CPC ...... G05D 1/106; G05D 1/0684; G08G 5/025; G08G 5/0013; B64F 1/20; B64D 45/08;
(Continued)

(56) References Cited

U.S. PATENT DOCUMENTS 3,537,066 A * 10/1970 Stingl ................. B64F 1/20
                                                           362/253
6,239,725 B1 * 5/2001 Bray .................. G08G 5/025
                                                           340/953

(Continued)

FOREIGN PATENT DOCUMENTS

DE          202017106907      *   3/2019
WO     WO-2019055690 A1     *   3/2019    ............. B64C 27/08

OTHER PUBLICATIONS

X. Yang, L. Mejias, and M. Garratt, "Multi-sensor data fusion for uav navigation during landing operations," in Australasian Conference on Robotics and Automation (ACRA 2011). Monash University, Melbourne, VIC: Australian Robotics and Automation Association Inc.,Monash University, 2011 (Year: 2011).*

(Continued)

*Primary Examiner* — Anne Marie Antonucci
*Assistant Examiner* — Jordan T Smith
(74) *Attorney, Agent, or Firm* — Conley Rose, P.C.

(57) ABSTRACT

An autonomous landing system for vertical landing aircraft includes a vertical landing aircraft including a powertrain and an onboard camera, a motion-stabilized visual cue including a visual indicator, wherein the visual cue is configured to maintain a fixed orientation of the visual indicator with respect to a horizon, and an autonomous control system configured to control a position of the aircraft with respect to the visual indicator of the visual cue based on image data captured by the onboard camera.

20 Claims, 7 Drawing Sheets

(51) Int. Cl.
  *B64D 47/08* (2006.01)
  *G05D 1/00* (2006.01)
  *G08G 5/02* (2006.01)

(58) Field of Classification Search
  CPC ........ B64D 47/08; G01S 5/16; G06V 10/255;
  G06V 10/82; G06V 20/17; G06V 20/56
  See application file for complete search history.

(56) References Cited

U.S. PATENT DOCUMENTS

| | | | |
|---|---|---|---|
| 8,219,267 B2* | 7/2012 | Hamke | G01P 5/00 |
| | | | 703/2 |
| 2018/0009546 A1* | 1/2018 | Filias | G08G 5/025 |
| 2018/0237161 A1* | 8/2018 | Minnick | B64F 1/007 |
| 2020/0012296 A1* | 1/2020 | Gurdan | B64F 1/22 |
| 2020/0073409 A1* | 3/2020 | Mai | G06T 7/90 |
| 2020/0130864 A1* | 4/2020 | Brockers | B64F 1/007 |
| 2021/0300591 A1* | 9/2021 | Tian | B64F 1/20 |
| 2023/0027342 A1* | 1/2023 | Kojima | G05D 1/0684 |

OTHER PUBLICATIONS

S. Saripalli, "Vision-based autonomous landing of an helicopter on a moving target," Proceedings of AIAA Guidance, Navigation, and Control Conference, Chicago, USA, 2009 (Year: 2009).*
Machine translation of DE202017106907U1 (Year: 2019).*

* cited by examiner

AUTONOMOUS LANDING SYSTEMS AND METHODS FOR VERTICAL LANDING AIRCRAFT

CROSS-REFERENCE TO RELATED APPLICATIONS

This application claims benefit of U.S. provisional patent application Ser. No. 62/978,458 filed Feb. 19, 2020, and entitled "Vertical Flight Aircraft Autonomous Landing Using a Visual Cue," which is hereby incorporated herein by reference in its entirety.

STATEMENT REGARDING FEDERALLY SPONSORED RESEARCH OR DEVELOPMENT

Not applicable.

BACKGROUND

Vertical take-off and landing (VTOL) aircraft are designed to take-off and land from a surface or platform vertically. The vertical take-off and landing capability provided by VTOL aircraft obviate the need for a horizontally extending runway, making VTOL aircraft particularly useful for landing in confined areas such as on the deck of a surface vessel. VTOL aircraft may include rotary-wing aircraft such as helicopters (e.g., coaxial-rotor helicopters, tiltrotor aircraft, quadrotor helicopters, etc.) as well as fixed-wing aircraft having, for example, thrust vectoring capability. Additionally, at least some VTOL aircraft include the capability of being piloted autonomously, without the need for pilot intervention, by an electronic control system located onboard and/or offboard the aircraft.

BRIEF SUMMARY OF THE DISCLOSURE

An embodiment of an autonomous landing system for vertical landing aircraft includes a vertical landing aircraft comprising a powertrain and an onboard camera, a motion-stabilized visual cue comprising a visual indicator, wherein the visual cue is configured to maintain a fixed orientation of the visual indicator with respect to a horizon, and an autonomous control system configured to control a position of the aircraft with respect to the visual indicator of the visual cue based on image data captured by the onboard camera. In some embodiments, the autonomous control system comprises an object detection module trained to visually identify a landing platform comprising the visual cue based on the image data captured by the onboard camera. In some embodiments, the autonomous control system comprises a machine vision module configured to determine a position and an orientation of the aircraft relative to the visual indicator based on the image data captured by the onboard camera. In certain embodiments, the autonomous control system comprises a feedback control module configured to reduce an error between a center of the onboard camera and a setpoint and to increase an area within a field of view of the camera of an object corresponding to the setpoint, wherein the object comprises one of the visual cue and a landing platform comprising the visual cue. In certain embodiments, the setpoint is provided by either an object detection module of the autonomous control system configured to detect the landing platform, or a machine vision module of the autonomous control system configured to identify the visual indicator. In some embodiments, the autonomous control system comprises a feedback control module configured to provide a control input to reduce an error between a center of the onboard camera and a setpoint and to increase an area within a field of view of the onboard camera of an object corresponding to the setpoint, wherein the object comprises one of the visual cue and a landing platform comprising the visual cue, and a reinforcement learning module configured to adjust the control input based on a magnitude of an environmental disturbance applied to the aircraft. In some embodiments, the magnitude of the environmental disturbance comprises a wind speed. In certain embodiments, the feedback control module comprises a nonlinear controller which comprises a nonlinear gain based on a probability density function.

An embodiment of a method for autonomously landing a vertical landing aircraft comprises (a) identifying a motion-stabilized visual cue based on image data captured by an onboard camera of the aircraft, wherein the visual cue is configured to maintain a fixed orientation of the visual indicator relative to a horizon, (b) controlling a position of the aircraft relative to a visual indicator of the visual cue by an autonomous control system, and (c) vertically landing by the autonomous control system the aircraft onto a landing platform comprising the visual cue. In some embodiments, the method further comprises (d) detecting the landing platform by an object detection module trained to identify the landing platform, and (e) autonomously controlling the position of the aircraft so as to reduce an error between a center of the onboard camera and a setpoint determined by the object detection module, and increase an area within a field of view of the onboard camera occupied by an object corresponding to the setpoint, wherein the object comprises one of the landing platform and the visual cue. In some embodiments, the method further comprises (d) providing a control input by a feedback control module to reduce an error between a center of the onboard camera and a setpoint and to increase an area within a field of view of the onboard camera of an object corresponding to the setpoint, wherein the object comprises one of the landing platform and the visual cue, and (e) adjusting the control input by a reinforcement learning module based on a magnitude of an environmental disturbance applied to the aircraft. In certain embodiments, (c) comprises (c1) transporting the aircraft by the autonomous control system into a hovering landing position offset from the visual cue by a predefined distance, and (c2) vertically lowering the aircraft onto the landing platform in response to the aircraft achieving the landing position.

An embodiment of an autonomous landing system for vertical landing aircraft comprises a processor, a storage device coupled to the processor and containing instructions that when executed cause the processor to control a position of the aircraft relative to a visual indicator of a motion-stabilized visual cue based on image data captured by an onboard camera of the aircraft, wherein the visual cue is configured to maintain a fixed orientation of the visual indicator with respect to a horizon. In some embodiments, the instructions when executed cause the processor to visually identify by an object detection module a landing platform comprising the visual cue based on the image data captured by the onboard camera. In some embodiments, the instructions when executed cause the processor to determine by a machine vision module a position and an orientation of the aircraft relative to the visual indicator based on the image data captured by the onboard camera. In certain embodiments, the instructions when executed cause the processor to reduce by a feedback control module an error between a center of the onboard camera and a setpoint corresponding to at least one of the visual cue and a landing platform comprising the visual cue. In certain embodiments, the setpoint is provided by either an object detection module configured to detect the landing platform, or a machine vision module configured to identify the visual indicator. In some embodiments, the instructions when executed cause the processor to provide a control input by a feedback control module to reduce an error between a center of the onboard camera and a setpoint and to increase an area within a field of view of the onboard camera of an object corresponding to the setpoint, wherein the object comprises one of the visual cue and a landing platform comprising the visual cue, and adjust the control input by a reinforcement learning module based on a magnitude of an environmental disturbance applied to the aircraft. In some embodiments, the magnitude of the environmental disturbance comprises a wind speed. In certain embodiments, the feedback control module comprises a nonlinear controller which comprises a nonlinear gain based on a probability density function.

BRIEF DESCRIPTION OF THE DRAWINGS

For a detailed description of exemplary embodiments of the disclosure, reference will now be made to the accompanying drawings in which.

DETAILED DESCRIPTION OF THE DISCLOSED EMBODIMENTS

Figure 1:
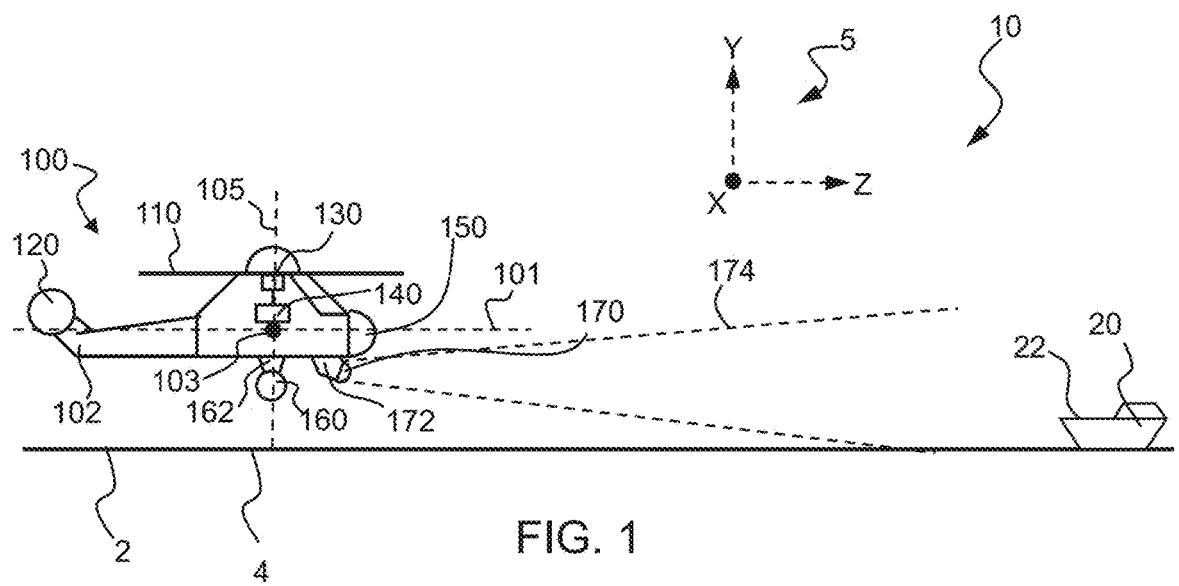
FIGS. 1-3 are schematic views of an autonomous landing system for vertical landing aircraft according to some embodiments.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

As described above, at least some VTOL aircraft are configured to have autonomous flight functionality whereby an onboard controller or autopilot which is configured to pilot the VTOL aircraft autonomously without the need for human intervention. The autopilot may be configured to pilot the VTOL aircraft after the VTOL aircraft has taken off under the control of a human pilot and before the VTOL aircraft is landed by the human pilot. However, the autopilots of other VTOL aircraft may be configured to land the VTOL aircraft autonomously without the need for human intervention.

Autonomous landing systems for vertical landing aircraft, such as VTOL aircraft, may rely on data provided by satellite-based radio-navigation systems such as the Global Positioning System (GPS) to guide the aircraft during landing. As used herein, the term "vertical landing aircraft" is defined as aircraft configured to land from a hovering position. However, reliance upon GPS by the autonomous landing system may prevent autonomously controlled VTOL aircraft from operating in GPS-denied environments where the GPS signal may be either too weak or obstructed by obstacles or electronically jammed or spoofed by an adversary. Additionally, some autonomous landing systems for vertical landing aircraft may rely on tracking a landing surface or platform upon which the aircraft is to be landed. Such conventional vertical landing systems inherently confine the operational range to a vertical approach towards the platform due to tracking platform motions or require additional methods to enable a horizontal approach toward the platform. Also, they may not be practically and safely utilized in applications where the landing surface is moving relative to a global frame of reference (e.g., a moving deck of a surface vessel) given that tracking a moving landing surface may induce erratic and unpredictable movement of the aircraft during landing which may destabilize the aircraft and even potentially increase the chance of aircraft roll over due to contact between the aircraft and the platform during landing. Further, some autonomous landing systems for vertical landing aircraft may be tailored to a specific type of vertical landing aircraft, for example, uncommon or specially designed sensors equipped for implementation of such autonomous landing systems and/or inner-loop autopilot system dependent on the particular aircraft. Thus, at least some autonomous landing systems may not be adaptable to other, varying types of vertical landing aircraft, limiting the adaptability and usefulness of the autonomous landing system.

Accordingly, embodiments disclosed herein provide for the autonomous landing of vertical landing aircraft without relying on GPS signals to thereby allow for autonomous, vertical landing of aircraft in GPS-denied environments. Additionally, embodiments disclosed herein provide for the autonomous landing of vertical landing aircraft by tracking a motion-stabilized visual cue to allow for smooth, stable control of the aircraft during landing onto a moving landing surface or platform. Embodiments disclosed herein also utilize an onboard camera, and a visual cue which may typically be included on offshore platforms such as surface vessels. Further, embodiments disclosed herein include an outer-loop controller configured to provide common control inputs such as, for example, pitch, roll, yaw (heading), and/or throttle (collective) without the need to manipulate an aircraft-dependent inner-loop autopilot system such that the outer-loop controller comprises a universal controller usable with a variety of types of vertical landing aircraft.

Additionally, embodiments disclosed herein may include a vertical landing aircraft comprising a powertrain and an onboard camera, a motion-stabilized visual cue comprising a visual indicator, wherein the visual cue is configured to maintain a fixed orientation of the visual indicator with respect to a horizon, and an autonomous control system configured to control a position of the aircraft with respect to the visual indicator of the visual cue based on image data captured by the onboard camera.

Figure 2:
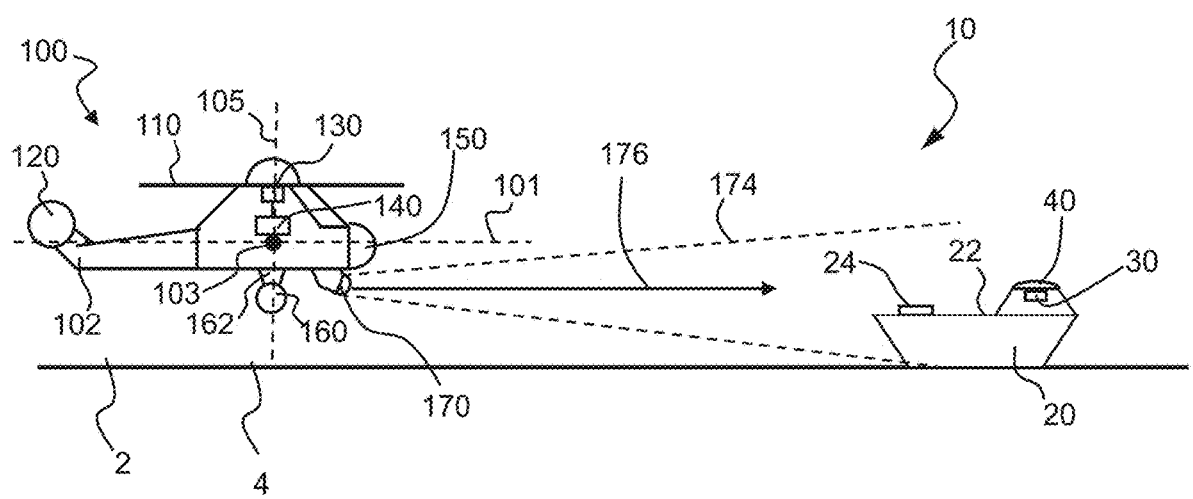
Figure 3:
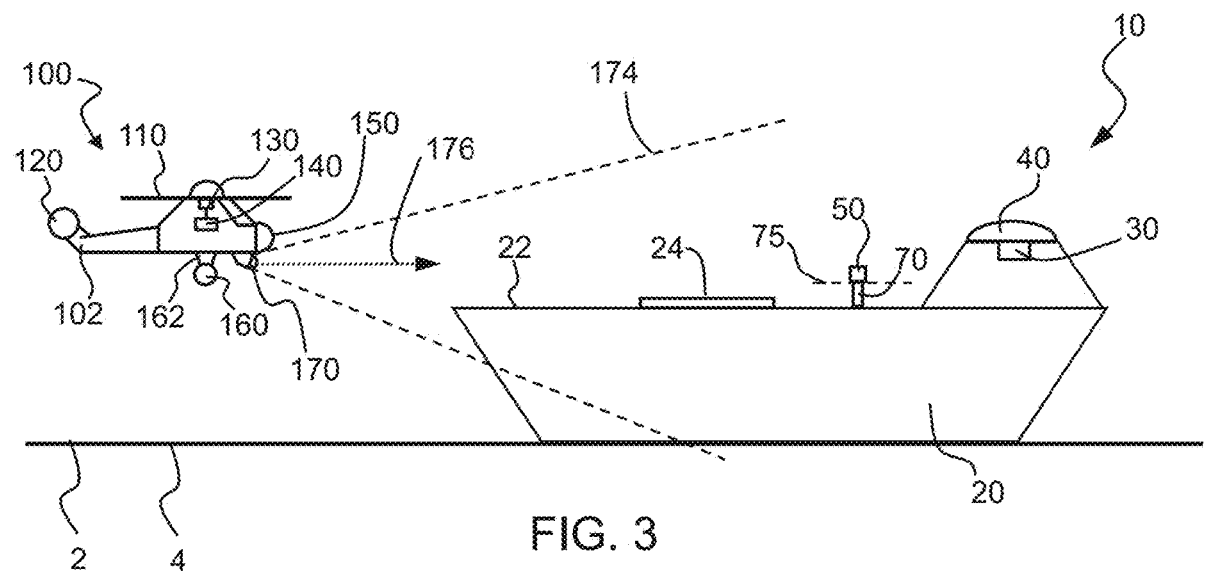

Referring now to FIGS. 1-3, an embodiment of an autonomous landing system for vertical landing aircraft 10 is shown. In this exemplary system, system 10 generally includes a surface vessel 20 and a vertical landing aircraft 100. As will be discussed further herein, system 10 is generally configured to vertically land aircraft 100 autonomously without relying on GPS onto surface vessel 20 which may move relative a global reference frame 5 represented in FIG. 1 by orthogonal X (extending orthogonally from the page in FIG. 1), Y, and Z axes.

In this exemplary embodiment, surface vessel 20 is positioned along a sea surface 2 and generally includes a generally horizontal deck or platform 22, an outer-loop controller 30, and a wireless communication system 40. A landing zone or pad 24 is located on the platform 22 and comprises the location on platform 22 at which aircraft 100 is to be landed. Surface vessel 20 comprises a ship having a propulsion system in this exemplary embodiment; however, in other embodiments, surface vessel 20 may comprise other types of offshore equipment such as, for example, an offshore platform, or a surfaced submarine. In still other embodiments, instead of an offshore platform 20, system 10 may include an onshore or land platform onto which the aircraft 100 is to be vertically landed. Surface vessel 20 may also be referred to herein as landing platform 20 which may comprise land-based and offshore structures.

Outer-loop controller 30 comprises a computer system including one or more memory devices and one or more processors and is in signal communication with wireless communication system 40. Outer-loop controller 30 may comprise a singular controller or computer system or a plurality of controllers or computer systems distributed about the surface vessel 20. Wireless communication system 40 is generally configured to communicate wirelessly with aircraft 100 and may comprise an antenna and other associated wireless communication equipment. Wireless communication system 40 may communicate with aircraft 100 via a variety of wireless communication protocols including, for example, communication via radio, Wi-Fi, and/or satellite. Thus, in some embodiments, wireless communication system 40 comprises a radio transceiver.

In this exemplary embodiment, surface vessel 20 additionally includes a visual cue 50 supported on the platform 22 of surface vessel 20. Particularly, visual cue 50 is motion-stabilized and is pivotably coupled, in this exemplary embodiment, to the platform 22 by a stabilizer system 70. Visual cue 50 is motion-stabilized to the global reference frame 5 such that visual cue 50 may not move along, or rotate about, any of the X, Y, and Z directions of global reference frame 5. To state in other words, visual cue 50 is stable to the horizon 4 defined by sea surface 2 such that visual cue 50 is held stationary and is not permitted to move relative to the horizon.

Figure 4:
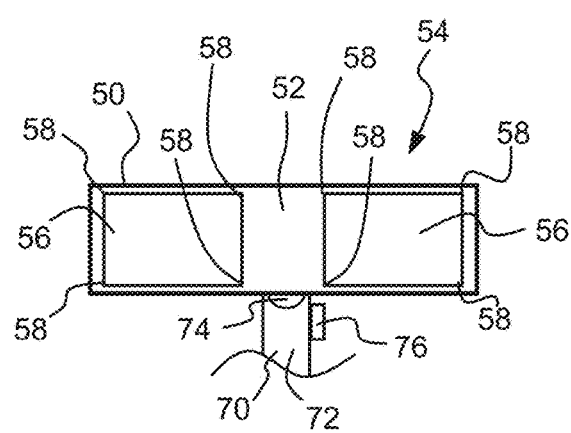
FIG. 4 is a front view of a visual cue of the system of FIGS. 1-3 according to some embodiments.

Referring to FIG. 4, visual cue 50 comprises an external surface 52 upon which a visual indicator or pattern 54 is positioned. As will be discussed further herein, visual indicator 54 may be tracked by aircraft 100 to allow helicopter to autonomously land vertically upon the landing pad 24 of surface vessel 20. In this exemplary embodiment, the visual indicator 54 positioned on external surface 52 comprises a pair of planar rectangles 56 positioned proximal opposing ends of external surface 52. Each rectangle 56 is defined by four separate and opposing ninety-degree corners 58 occupying distinctive positions on the external surface 52 of visual cue 50. Given that visual indicator 54 comprises a pair of rectangles 56, visual indicator 54, in this exemplary embodiment, comprises a total of eight corners 58. As will be discussed further herein, corners 58 of visual indicator 54 may be used by aircraft 100 to determine a position and/or orientation of aircraft 100 relative to visual cue 50. Each rectangle 56 of visual indicator 54 may comprise a solid color that is visually distinguishable from the color of external surface 52 to visually distinguish rectangles 56 from external surface 52 and the background behind visual cue 50. For example, rectangles 56 of visual indicator 54 may each comprise a distinctive color to differentiate rectangles 56 from the background behind visual cue 50. The color of each rectangle 56 may be fixed or may vary. For example, each rectangle 56 may be comprised of a plurality of light emitting diodes (LEDs) configured to selectably produce a variety of colors.

Figure 5:
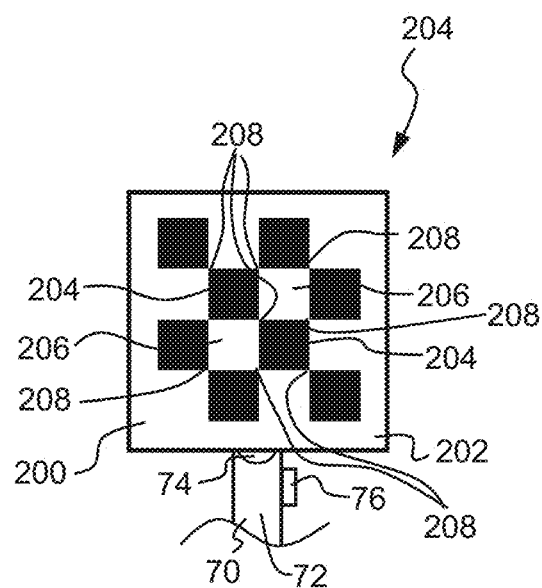
FIG. 5 is a front view of an alternative visual cue of the system of FIGS. 1-3 according to some embodiments.

Although in this embodiment visual indicator 54 comprise a pair of rectangles 56, in other embodiments, the configuration of visual indicator 54 may vary. For example, referring briefly to FIG. 5, another visual cue 200 is shown which may be used in lieu of visual cue 50 in landing system 10. Visual cue 200 comprises an external surface 202 upon which a visual indicator or pattern 202 is positioned. In this exemplary embodiment, visual indicator 202 comprises a plurality of solid rectangles 204 and a plurality of white rectangles 206 arranged in a planar checkerboard pattern. The solid rectangles 204 and white rectangles 206 of visual indicator 202 define a plurality of ninety-degree corners 208 at the interstices formed between rectangles 204, 206. In this configuration, a total of nine corners 208 are defined within the checkerboard pattern formed by rectangles 204, 206. The configuration of visual cue of system 10 may vary still from the configuration of visual cue 200 shown in FIG. 5. For example, in other embodiments, the visual cue may of system 10 may comprise circular markers or other geometrical figures.

Referring again to FIG. 4, stabilizer system 70 is configured to couple visual cue 50 to platform 22 such that visual cue 50, along with visual indicator 54, is motion-stabilized relative to global reference frame 5. Given that platform 22 may move with six-degrees of freedom (DOF) relative to global reference frame 5 (i.e., platform 22 may move along and/or rotate about each of the X, Y, and Z directions of global reference frame 5), mounting system 50 permits visual cue 50 to move with up to six DOF relative to platform 22.

In this exemplary embodiment, stabilizer system 70 generally includes a mount 72, one or more actuators 74, and a stabilizer control system 76. Mount 72 physically connects visual cue 50 to the platform 22 of surface vessel 20 whereby the visual indicator 54 of visual cue 50 is located at a predefined position and orientation relative to the landing pad 24 located on platform 22. Actuators 74 of stabilizer system 70 are configured to selectably move visual cue 50 with one or more DOF relative to platform 22. Particularly, actuators 74 may be configured to stabilize visual cue 50 in a roll DOF. For example, actuators 74 may rotate visual cue about a roll axis 75 (shown in FIG. 3) of visual cue 50. Stabilizer control system 76 of stabilizer system 70 is configured to actuate the actuators 74 of system 70 to motion-stabilize visual cue 50 relative to global reference frame 5. For example, in some embodiments, stabilizer control system 76 may selectably rotate visual cue 50 about roll axis 75 in response to motion of platform 22 (e.g., due to wave action, wind forces, etc., applied to surface vessel 20) so as to maintain a horizontally extending, longitudinal axis of visual cue 50 parallel the horizon 4. In this manner, stabilizer control system 76 is configured to maintain the visual cue 50 in a stationary position about the roll axis 75 relative to the global reference frame 5.

Stabilizer control system 76 may comprise a gyroscope to measure tilting movement of the platform 22 which may be counteracted through corresponding actuation of the actuators 74 of stabilizer system 70 such that visual cue 50 does not tilt with respect to the horizon 4. Thus, in at least some embodiments, visual cue 50 may comprise a gyro-stabilized visual cue 50. In other embodiments, rather than mechanically actuating one or more actuators 74 to prevent tilting of visual cue 50 relative to the horizon 4, the visual indicator 54 of visual cue 50 may be electronically actuated to maintain the horizontality of rectangles 56 relative to the horizon 4. For example, visual indicator 54 may comprise a plurality of LEDs, infrared lights, etc., which define rectangles 56. By selectably lighting the LEDs of visual indicator 54 based on data provided by a gyroscope, the rectangles 56 may be moved about the external surface 52 of visual cue 50 in response to motion of the platform 22 of surface vessel 20 and thereby maintain the horizontality of rectangles 56 relative to the horizon 4. In such an embodiment, visual cue 50 may be hard-mounted, rather than pivotably mounted, to the platform 22 of surface vessel 20.

Referring again to FIGS. 1-3, in this exemplary embodiment, aircraft 100 of system 10 generally includes a fuselage 102, a primary rotor system 110, a secondary or tail rotor system 120, a powertrain 130, an inner-loop controller 140, a wireless communication system 150, landing gear 160, and an onboard camera 170. Although in this embodiment aircraft 100 comprises a helicopter which includes a single primary rotor system 110 and a tail rotor system 120, in other embodiments, aircraft 100 may comprise varying types of rotary-wing aircraft such as tilt rotor aircraft and multicopters. In still other embodiments, system 10 may include a fixed wing aircraft in lieu of aircraft 100 which may vertically land autonomously on the landing pad 24 of surface vessel 22.

The primary rotor system 110 and tail rotor system 120 each comprise a plurality of rotor blades extending radially from a rotational axis of the primary rotor system 110 and a rotational axis of the tail rotor system 120, respectively. Powertrain 130 of aircraft 100 is configured to provide motive power to both the primary rotor system 110 and the tail rotor system 120 and may generally include one or more engines, transmission, and other equipment associated therewith.

Inner-loop controller 140 is generally configured to control the operation of rotor systems 110, 120 and powertrain 130 to thereby control the trajectory and orientation of aircraft 100. For example, inner-loop controller may control the rotational speed of rotor systems 110, 120, and the angle of attack or pitch angle of each rotor blade of rotor systems 110, 120. In this manner, inner-loop controller 140 may control a roll of aircraft 100 about a roll axis 101 of aircraft 100, a pitch of aircraft 100 about a pitch axis 103 (extending out of the page in FIG. 1) of aircraft 100, and a yaw of aircraft 100 about a yaw axis 105 of aircraft 100. Inner-loop controller 140 may, at times, control the operation of rotor systems 110, 120, and powertrain 130 in response to control inputs provided by a pilot of aircraft 100. However, inner-loop controller 140 is also configured to pilot aircraft 100 autonomously without the need of the intervention of a pilot or other human.

Communication system 150 of aircraft 100 is generally configured to communicate wirelessly with the wireless communication system 40 of surface vessel 20 and may comprise an antenna and other associated wireless communication equipment. Additionally, wireless communication system 150 of aircraft 100 may communicate with the wireless communication system 40 of surface vessel 20 via a variety of wireless communication protocols including, for example, communication via radio, Wi-Fi, and/or satellite. Thus, in some embodiments, wireless communication system 150 comprises a radio transceiver. As will be discussed further herein, information may be exchanged between inner-loop controller 140 of aircraft 100 and outer-loop controller 30 of surface vessel 20 via the wireless communication systems 150, 40 of aircraft 100 and surface vessel 20, respectively.

The landing gear 160 of aircraft 100 is configured to support the weight of aircraft 100 when aircraft 100 is not airborne. In this exemplary embodiment, landing gear 160 comprises a pair of wheels; however, in other embodiments, the configuration of landing gear 160 may vary. Additionally, in this exemplary embodiment, landing gear 160 is connected to fuselage 102 by a suspension system 162 extending therebetween. Suspension system 162 comprises one or more shock absorbers and/or other equipment configured to permit landing gear 160 to move relative to fuselage 102. In this manner, suspension system 162 may absorb impact energy applied to aircraft 100 as the aircraft 100 lands. Suspension system 162 also allows aircraft 100 to safely land against a surface, such as landing pad 24 of surface vessel 20, which is oriented at an angle or incline relative to the orientation of aircraft 100.

As shown particularly in FIG. 1, onboard camera 170 of aircraft 100 is generally configured to visually track the surface vessel 20 and visual cue 50 whereby aircraft 100 may be vertically landed onto the landing pad 24 of surface vessel 20. In this exemplary embodiment, onboard camera 170 comprises a mono camera including a single lens or a plurality of lenses positioned along a common lens axis which produce a monocular image. However, in other embodiments, onboard camera 170 may comprise a stereo camera having a pair of lenses positioned along a pair of offset lens axes and which may produce a stereo image. In still other embodiments, aircraft 100 may comprise a plurality of mono and/or stereo cameras located at various positions on the aircraft 100. In this exemplary embodiment, onboard camera 170 comprises a digital video camera having a resolution of approximately between 10 megapixels and 20 megapixels and a refresh rate of approximately between 60 Hertz (Hz) and 240 Hz; however, in other embodiments, the resolution and/or refresh rate of onboard camera 170 may vary.

Onboard camera 170 is mounted to the fuselage 102 of aircraft 100 by a mounting system 172 extending between the fuselage 102 and onboard camera 170. In this exemplary embodiment, mounting system 172 comprises a gimbal mount 172 configured to compensate for roll motion of fuselage 102 about roll axis 101 and pitch motion of fuselage 102 about pitch axis 103. Gimbal mount 172 is also configured to stabilize onboard camera 170 from oscillatory movement of fuselage 102. In this manner, onboard camera 170 may be substantially isolated from oscillatory movement of fuselage 102 as well as roll and pitch of fuselage 102 about the roll and pitch axes 101, 103, respectively. Additionally, gimbal mount 172 orients onboard camera 170 in a forward-looking position such that the lens axis of onboard camera 170 extends parallel the horizon 4. As will be discussed further herein, aircraft 100 may approach surface vessel 20 in a forward direction parallel with the Z-direction of the global reference frame 5. Further, while in this exemplary embodiment onboard camera 170 is attached to fuselage 102 by gimbal mount 172, in other embodiments, onboard camera 170 may be hard-mounted to fuselage 102.

As described above, the outer-loop controller 30 of surface vessel 20 and the inner-loop controller 140 of aircraft 100 may each cooperatively control the operation of aircraft 100 so as to allow helicopter to vertically land autonomously on the landing pad 24 of surface vessel 20. While in this exemplary embodiment outer-loop controller 30 is located on surface vessel 20, in other embodiments, outer-loop controller 30 may be located remote surface vessel 20 such as, for example, in a command center or other structure located onshore. In still other embodiments, outer-loop controller 30 may be located onboard aircraft 100 along with inner-loop controller 140. For example, outer-loop controller 30 may be embodied in instructions or software stored on a memory or storage device of aircraft 100 and executed on a processor of aircraft 100.

Figure 6:
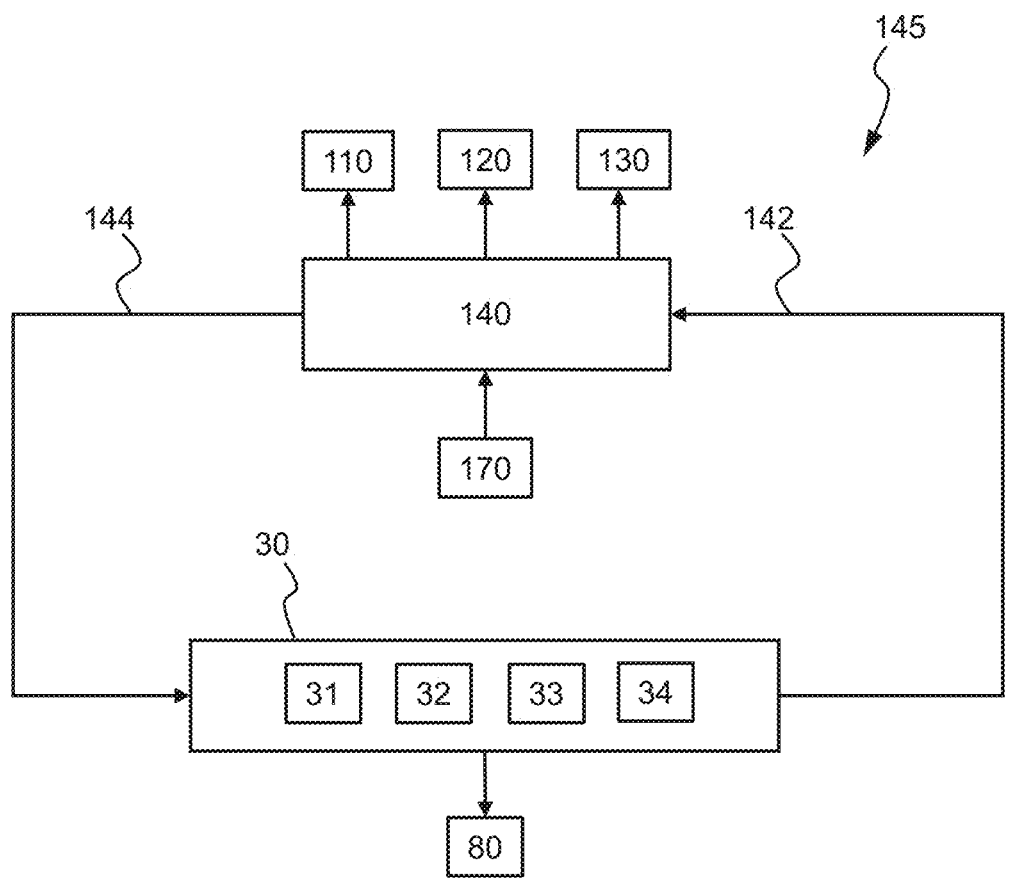
FIG. 6 is a block diagram of an autonomous control system of the system of FIGS. 1-3 according to some embodiments.

Referring to FIG. 6, outer-loop controller 30 and inner-loop controller 140 collectively comprise an autonomous control system or autonomous control system 145 of aircraft 100. In this exemplary embodiment, inner-loop controller 140 receives a plurality of control inputs 142 transmitted from the outer-loop controller 30 via wireless communication systems 40, 150 of surface vessel 20 and aircraft 100, respectively. Inner-loop controller 140 also applies the control inputs 142 received from inner-loop controller 30 to the primary rotor system 110, tail rotor system 120, and/or powertrain 130. Particularly, the control inputs 142 may comprise throttle, pitch, roll, and yaw rates demanded by outer-loop controller 30. The inner-loop controller 140 is configured to generate the pitch, roll, and yaw rates in aircraft 100 specified by control inputs 142. Thus, inner-loop controller 140 may be specific or tailored to the particular configuration of aircraft 100 (e.g., the particular configuration of rotor systems 110, 120, powertrain 130, etc.) so that inner-loop controller 140 may provide the pitch, roll, and yaw rates demanded by outer-loop controller 30. Additionally, inner-loop controller 140 receives information from onboard camera 170 which is transmitted to the outer-loop controller 40 as image data 144 via wireless communication systems 40, 150. Image data 144 may comprise information corresponding to raw images captured by onboard camera 170. Image data 144 may be transmitted from inner-loop controller 140 to outer-loop controller 30 at a frequency which represents the refresh rate of onboard camera 170.

While inner-loop controller 140 is tailored specifically to aircraft 100, outer-loop controller 30 may be generic to aircraft 100 and thus may be utilized for a variety of varying types of vertically landing aircraft without needing to specifically tailor outer-loop controller 30 to any given aircraft. This provides outer-loop controller 30 with added flexibility and ease of use when implementing outer-loop controller 30 with given vertically landing aircraft.

In this exemplary embodiment, outer-loop controller 30 generally includes an object detection module 31, a machine vision module 32, a feedback control module 33, and a reinforcement learning module 34. In some embodiments, outer-loop controller 30 may provide a video output 80 comprising the raw images received from the inner-loop controller 140. Object detection module 31 of outer-loop controller 30 is generally configured to detect the presence of one or more objects of interest within a field of view 174 (shown in FIGS. 1-3) of onboard camera 170 based on the image data 144 provided to the outer-loop controller 30. Particularly, object detection module 31 is configured to identify and locate both the surface vessel 20 and the visual cue 50 within the images captured by onboard camera 170.

In this exemplary embodiment, object detection module 31 comprises a machine learning object detection algorithm that is trained using a plurality of images of the surface vessel 20 and visual cue 50 taken at varying distances and locations relative to the surface vessel 20 and visual cue 50. The surface vessel 20 and visual cue 50 may each be labeled in the images used to train the object detection algorithm so that the algorithm may learn the various visual features comprising the surface vessel 20 and visual cue 50. In this exemplary embodiment, the object detection algorithm comprises a you-only-look-once (YOLO) algorithm including a single neural network configured to predict an object's class and position within an image; however, in other embodiments, the configuration of the object detection algorithm may vary. The use of a machine learning object detection algorithm, such as a YOLO algorithm, may significantly increase the distance between onboard camera 170 and the surface vessel 20 at which the surface vessel 20 and visual cue 50 may be identified and located by the object detection module 31. As a non-limiting example, object detection module 31, equipped with a machine learning object detection algorithm, may detect the presence of a platform having a size approximately two meters by two meters at a distance of more than 250 meters. Given that detection range is proportional to the size of the object to be detected, an object having, for example, an area of approximately 15 meters by 15 meters may be detected tens of kilometers away using a machine learning object detection algorithm Machine vision module 32 of outer-loop controller 30 is generally configured to extract information from the raw images corresponding to the image data 144 received by outer-loop controller 30 from inner-loop controller 140.

Particularly, machine vision module 32 may determine a relative distance between onboard camera 170 and either surface vessel 20 or visual cue 50. The relative distance determined by machine vision module 32 may be a vector including both a magnitude and a direction relative to the global reference frame 5. Machine vision module 32 may determine a distance between onboard camera 170 and each of a plurality of visually distinguishable features of the visual indicator 54 of visual cue 50, such as corners 58 for example. Particularly, in this exemplary embodiment, with aircraft 100 in sufficient range of surface vessel 20 and visual cue 50 within the field of view 174 of onboard camera 170, machine vision module 32 may determine the position and orientation of aircraft 100 and visual cue 50 by identifying the relative distance between onboard camera 170 and each of the corners 58 of the visual indicator 54. Corners 58 may be identified by machine vision module 32 given that corners 58 present the greatest visual gradient in all directions of visual indicator 54. As will be discussed further herein, the distances between onboard camera 170 and corners 58 of visual indicator 54 may be used by feedback control module 33 and reinforcement learning module 34 to guide aircraft 100 into a hovering landing position located directly above the landing pad 24 of surface vessel 20.

Machine vision module 32 may apply a Forstner corner detection technique to determine the location of each corner 58 located within a given image captured by onboard camera 170. Particularly, pixel information of an image captured by onboard camera 170 in the proximity of a given corner 58 may be obscured or otherwise unclear. Not intending to be bound by any theory, the position of the obscured or unclear corner 58 may however be approximated in accordance with Equation (1) listed below, where ($\widehat{C_u}, \widehat{C_v}$) represents the ideal corner position, ($C_u$, $C_v$), represents the approximated corner position, and $\nabla f(u, v)$ represents the image gradient at an image pixel position (u, v):

$$(\hat{c}_u, \hat{c}_v) = \arg\min_{c_u, c_v} \sum_{u,v \in N} ([\nabla f(u, v)]^T (u - c_u, v - c_v))^2 \quad (1)$$

The image gradient $\nabla f(u, v)$ at the image pixel position (u, v) is perpendicular to a line extending from pixel position (u, v) to corner position ($C_u$, $C_v$). To obtain ($c_u$, $c_v$), a least square estimation in a small window may be used. The projection of the line from ($c_a$, $c_v$) to (u, v) on to the tangent line at (u, v) is maximized in the given window. In other words, the projection of the image gradient on to the line segment connecting ($c_a$, $c_v$) and (u, v) is minimized for all (u, v) inside the window N.

Not intending to be bound by any theory, a conventional pinhole camera model may be used to derive the geometric relation between onboard camera 170 and a planar object (e.g., visual indicator 54 of visual cue 50). For example, consider the three-dimensional (3D) visual cue 50 in the space captured by onboard camera 170. A three-dimensional (3D) coordinate system may be defined with respect to visual cue 50 and a two-dimensional (2D) coordinate system is associated with a given image frame provided by onboard camera 170 capturing visual cue 50. (X, Y, Z) comprises a point on the visual cue 50 described in an object-fixed frame, and (u, v) comprises a corresponding point on the image frame (pixel position in the image). Not intending to be bound by any particular theory, the relationship between the image coordinates (u, v) and the object-fixed coordinates (X, Y, Z) in matrix form may be described in accordance with Equation (2) below, where R represents a 3×3 rotation matrix, t represents a 3×1 translation vector, s represents a scaling factor derived from transforming homogenous coordinates to cartesian coordinates, $O_{1\times 3}$ represents a 1×3 zero matrix, and A represents a camera intrinsic matrix:

$$s \begin{bmatrix} u \\ v \\ 1 \end{bmatrix} = A \begin{bmatrix} R & t \\ O_{1\times 3} & 1 \end{bmatrix}^{-1} \begin{bmatrix} X \\ Y \\ Z \\ 1 \end{bmatrix} \quad (2)$$

Rotation matrix R includes information about the orientation of onboard camera 170 with respect to visual cue 50 and translation vector t gives the information of the distance between onboard camera 170 and the particular (X, Y, Z) point in the visual cue 50 body-fixed frame. The matrix of Equation (2) including R, t, $O_{1\times 3}$, and 1 may be referred to as the camera extrinsic matrix, which varies from image to image. Not intending to be bound by any theory, the components of camera intrinsic matrix A may be expressed as shown in Equation (3) below, where $1/\mu_u$ and $1/\mu_v$ represent parameters that scale the image coordinates which are in pixels to values in International System of Units (SI), $u_0$ and $v_0$ represent the center position in the image plane, and $f_x$ and $f_3$, represent the focal lengths of onboard camera 170 in the X and Y directions, respectively.

$$A = \begin{bmatrix} 1/\rho_u & 0 & u_0 \\ 0 & 1/\rho_v & v_0 \\ 0 & 0 & 1 \end{bmatrix} \begin{bmatrix} f_x & 0 & 0 & 0 \\ 0 & f_y & 0 & 0 \\ 0 & 0 & 1 & 0 \end{bmatrix} \quad (3)$$

The first matrix of Equation (3) shifts the center of the image plane to the top left corner point. The second matrix of Equation (3) contains the focal length information $f_x$ and $f_y$. The product of the two matrices of Equation (3) forms the camera intrinsic matrix A, which is specific to the parameters of onboard camera 170. The parameters of the camera intrinsic matrix A may be found using a camera calibration.

Not intending to be bound by any particular theory, the rotation vector and translation vector t may be obtained by solving Equation (2) above. The estimation of the rotation vector and translation vector t may also be referred to as pose estimation of onboard camera 170. Different algorithms may be utilized to determine the post of onboard camera 170. For example, a Perspective-n-Point (PnP) algorithm may be applied where, given a set of n 3-D coordinates of an object and its corresponding 2-D projections on the image, the PnP algorithm may estimate the pose of onboard camera 170. Given that there are six DOF for onboard camera 170, which include three DOF in rotation (roll, pitch, yaw) and three DOF in translation (X, Y, Z), a minimum of three points are required to find a solution which is not unique. There should be a minimum of four points to obtain a unique solution; however, it may be more reliable and redundant when there are more points.

In some embodiments, an iterative method may be used for the PnP algorithm given that the PnP algorithm is robust for objects which consist of a planar surface, such as visual cue 50. The iterative method may be based on Levenberg-Marquardt optimization. In this iterative method, the function finds such a pose that minimizes re-projection error, which comprises the sum of squared distances between the observed image points (u, v) and projected object points (X, Y, Z). By default, the iterative algorithm sets the initial value of rotation and translation as zero and then updates during each iteration.

In some embodiments, a random sample consensus (RANSAC) technique of OpenCV may be used to find a rough estimation for the camera extrinsic matrix of Equation (2) above. The RANSAC technique may also identify and remove the outliers during the calculation. The initial guess and inliers are fed to the iterative algorithm to provide a more accurate estimation. In some embodiments, the OpenCV solvePnP algorithm may be used to estimate the rotation vector and the translation vector t. In some embodiments, the rotation vector may be converted into the rotation matrix R using a Rodrigues function. Once the rotation matrix R and translation vector t are obtained, $-R^{-1}t$ may be obtained to provide the relative distances in 3D from onboard camera 170 to the origin of the visual cue 50 body-fixed frame.

The technique described above may be modified to leverage the stabilization of onboard camera 170 provided by gimbal mount 172. Given that gimbal mount 172 corrects for the roll and pitch motion of onboard camera 170, the images captured by onboard camera 170 may only reflect the yaw or heading angle with respect to the visual cue 50. Thus, roll and pitch angles computed from images provided by onboard camera 170 may be regarded as camera noise and gimbal correction errors. Therefore, the roll and pitch angles may be excluded from the position estimation. Not intending to be bound by any particular theory, the basic $R_{basic}$ and modified $R_{modified}$ rotation matrices are expressed in Equations (4) and (5), respectively, below, where $\alpha$, $\beta$, and $\gamma$ represent yaw, pitch, and roll angles, respectively:

$$R_{basix} = \begin{bmatrix} c\alpha c\beta & c\alpha s\beta s\gamma - s\alpha c\gamma & c\alpha s\beta c\gamma + s\alpha s\gamma \\ s\alpha c\beta & s\alpha s\beta s\gamma - c\alpha c\gamma & s\alpha s\beta c\gamma + c\alpha s\gamma \\ -s\beta & c\beta s\gamma & c\beta c\gamma \end{bmatrix} \quad (4)$$

$$R_{modified} = \begin{bmatrix} \cos\alpha & -\sin\alpha & 0 \\ \sin\alpha & -\cos\alpha & 0 \\ 0 & 0 & 1 \end{bmatrix} \quad (5)$$

Each row of the basic $R_{basic}$ and modified $R_{modified}$ rotation matrices contributes to their respective (X, Y, Z) coordinates. In some embodiments, by setting pitch and roll angle to zero, the modified rotation matrix $R_{modified}$ is obtained from the basic rotation matrix $R_{basic}$. The yaw angle is taken into consideration because it is required to set an approaching course for aircraft 100 by maintaining a designated heading angle. The third row of the modified rotation matrix shows that the Z-coordinate is independent of the yaw angle $\alpha$. Hence, the yaw angle provides no contribution in the estimation of forward relative distance (Z-coordinate) between the onboard camera 170 and visual cue 50. However, the sideward relative distance (X-coordinate) and vertical relative distance (Y-coordinate) are heavily dependent on the yaw angle.

The yaw angle may become noisy at relatively large distances from the surface vessel 20. In some embodiments, a moving average filter may be applied in order to compensate for noise in the estimation of the yaw angle. The moving average of the yaw angle may be determined using the history of the previous estimated yaw angles. A range comprising lower and upper bounds may be defined for the next estimated yaw angle with respect to the current yaw angle average. Whenever a newly estimated yaw angle is outside of the defined range, the estimated yaw angle may be rejected and replaced instead with the current yaw angle average. In this manner, the moving average filter may provide a stable yaw angle estimation by tracking a trend of yaw angle estimations.

The above described exemplary techniques for obtaining the relative distances in 3D (i.e., the X, Y, and Z distances with respect to global reference frame 5) from onboard camera 170 to the origin of the visual cue 50 provide a continuously smooth estimation of the current position of onboard camera 170 and with reasonable accuracy. It may be important to provide a smooth estimation of the current position of onboard camera 170 in order to minimize arbitrary, and erratic movement of aircraft 100 as it is guided by autonomous control system 145 towards the landing pad 24 of surface vessel 20. However, when aircraft 100 is in proximity to visual cue 50 and more pixel data is available with respect to visual cue 50, the above described exemplary techniques provides precise estimates of the 3D distance between onboard camera 170 and visual cue 50 to ensure a safe landing of aircraft 100 onto landing pad 24 of surface vessel 20.

Feedback control module 33 of outer-loop controller 30 is generally configured to minimize an error between a position of a camera center (indicated by arrow 176 in FIGS. 2, 3) and a center of a target object or setpoint (e.g., surface vessel 20, visual cue 50). As will be described further herein, at relatively long distances object detection module 31 estimates the position of the setpoint (surface vessel 20) relative to the camera center 176. However, at relatively closer distances machine vision module 32 estimates the position of the setpoint (visual cue 50) relative to the camera center 176. As aircraft 100 travels towards surface vessel 20, outer-loop controller 30 may switch from controlling the position of aircraft 100 based on object detection module 31 to machine vision module 32 when aircraft 100 is within sufficient proximity to visual cue 50 such that machine vision module 32 may reliably and accurately determine a position of the aircraft 100 relative to visual cue 50. The distance between aircraft 100 and visual cue 50 at which machine vision module 32 may reliably and accurately determine a position of the aircraft 100 relative to visual cue 50 may depend on the size of visual cue 50, the resolution of onboard camera 170, and the quality of the filter.

Feedback control module 33 may include derivative, integral, and proportional controllers configured using the summation and difference of position error. Additionally, an update rate of autonomous control system 145 (e.g., the amount of time required to perform one cycle of system 145) may be relatively slow when onboard camera 170 is at a large distance from surface vessel 20, controlling aircraft 100 based on the summation and difference of position error may, in some applications, lead to erratic behavior of aircraft 100. To address this issue, in some embodiments, feedback control module 33 may include a nonlinear controller having a nonlinear gain based on a probability density function. As described further herein, a nonlinear controller having a nonlinear gain based on a probability density function may prevent feedback control module 33 from responding to unrealistic or spurious estimates of the position or movement of aircraft 100 which are unrealistic based on the physical flight characteristics of aircraft 100. Multiplying a gain with a low probability corresponding to the low probability of the occurrence of the unrealistic position or movement of aircraft 100. For example, and not intending to be bound by any particular theory, feedback control module 33 may include a nonlinear controller in accordance with Equation (6) below, where Kp represents the nonlinear gain, e(t) represents an error between the position of a setpoint r(t) and a camera center position c at time t, u(t) represents the control law having an exponential term with constant a in the nonlinear gain Kp:

$$e(t) = r(t) - c \quad (6)$$
$$u(t) = K_P\{e(t)\} \times e(t)$$
$$= -(e^{ac(t)} - 1) \times e(t) \quad (e(t) < 0)$$
$$(e^{ac(t)} - 1) \times e(t) \quad (e(t) \geq 0)$$

Figure 7:
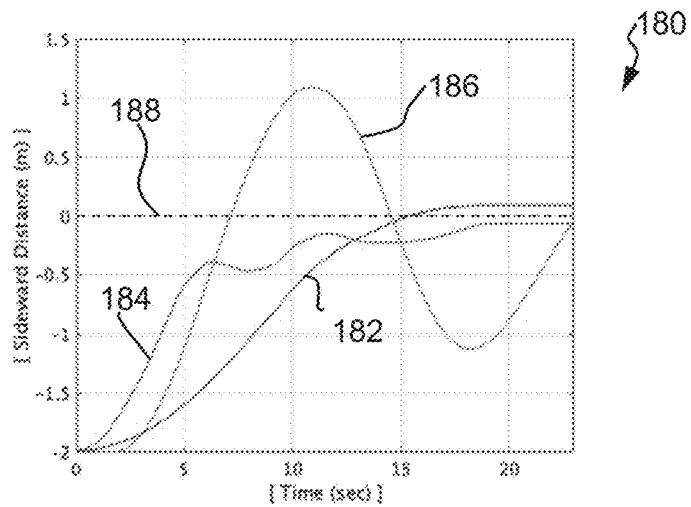
FIG. 7 is a graph illustrating performance of an exemplary nonlinear controller according to some embodiments.

The constant a may be provided in the nonlinear gain Kp to decay control magnitude exponentially near zero error. In this exemplary embodiment, the nonlinear controller may minimize overshoot around the setpoint r(t) by decaying quickly. In some embodiments, the nonlinear controller of feedback control module 33 may be configured for pitch, roll, and throttle with a different selection of constant a. In instances where the update rate of autonomous control system 145 is relatively slow, the nonlinear controller may still be able to achieve both effective setpoint tracking and smooth, stable control of aircraft 100 compared to linear proportional controllers which utilize fixed gains. For example, referring briefly to FIG. 7, a graph 180 is shown indicating the performance of an exemplary nonlinear controller 182 compared to a linear proportional-integral-derivative (PID) controller 184, a linear proportional controller 186 with respect to a setpoint 188 which may correspond to an object comprising one of the surface vessel 20 and the visual cue 50. Particularly, graph 180 illustrates sideward distance (distance in the X-direction of the global reference frame 5 shown in FIG. 1) in meters (m) of an exemplary aircraft over time in seconds (sec). In this example, the nonlinear controller provides smoother, more stable, and safer control over the exemplary aircraft than either the PID controller 184 or the linear proportional controller 186.

Referring again to FIG. 6, in some embodiments, the nonlinear controller of feedback control module 33 may be utilized to provide control inputs 142 at relatively larger distances when object detection module 31 estimates the error between the setpoint position and the camera center 176 while a linear derivative, integral, and/or proportional controller may be used to provide control inputs 142 at relatively shorter distances when machine vision module 32 is responsible for estimating the error between the setpoint position and the camera center 176. In this manner, feedback control module 33 is generally configured to provide a control input 142 to reduce an error between the camera center 176 of the onboard camera 170 and the setpoint 188, and to increase an area within the field of view 174 of the onboard camera 170 of an object (e.g., surface vessel 20, visual cue 50) corresponding to the setpoint 188.

In some embodiments, feedback control module 33 may employ a Kalman filter and a nonlinear derivative controller including a nonlinear gain based on a probability density function at relatively short distances in order to minimize noise in the control inputs 142 and thereby maximize the stability of aircraft 100. For example, a single state Kalman filter may be applied with unity feedback such that the Kalman filter does not require a prediction from a separate model specific to aircraft 100 and may comprise a "model-free" estimator. In addition to the Kalman filter, a nonlinear derivative controller along with linear proportional and integral controllers may be applied to minimize errors in the estimations provided by the Kalman filter which may result from spurious error differences occasionally applied to the Kalman filter. Not intending to be bound by any particular theory, the nonlinear derivative controller may be configured by introducing a normal distribution concept as expressed below in Equation (7), where $de(t_k)$ represents an error difference between time $t_k$ and $t_{k-1}$, $u(t_k)$ represents a control law that has linear proportional and integral terms as well as a nonlinear derivative term, $K_P$ and $K_I$ represent constant proportional and integral gains, respectively, and $K_D\{de(t_k)\}$ represents a nonlinear derivative gain that is a function of error difference, $de(t_k)$:

$$de(t_k) = e(t_k) - e(t_{k-1}) \quad (7)$$
$$u(t_k) = K_P e(t_k) + K_I \sum_{k=1}^{k} e(t_k) dt_k + K_D\{de(t_k)\} \frac{de(t_k)}{dt_k}$$

Not intending to be bound by any particular theory, error difference $de(t_k)$ is specified below in Equation (8), where (x) represents a probability density function that forms a normal distribution, σ represents a standard deviation, b represents a constant, and μ represents a mean value:

$$f(x) = \frac{1}{\sqrt{2\pi\sigma^2}} e^{-0.5 \frac{(x-\mu)^2}{\sigma^2}} \quad (8)$$
$$K_D\{de(t_k)\} = be^{-0.5 \frac{(de(t_k)-\mu)^2}{\sigma^2}}$$

Figure 8:
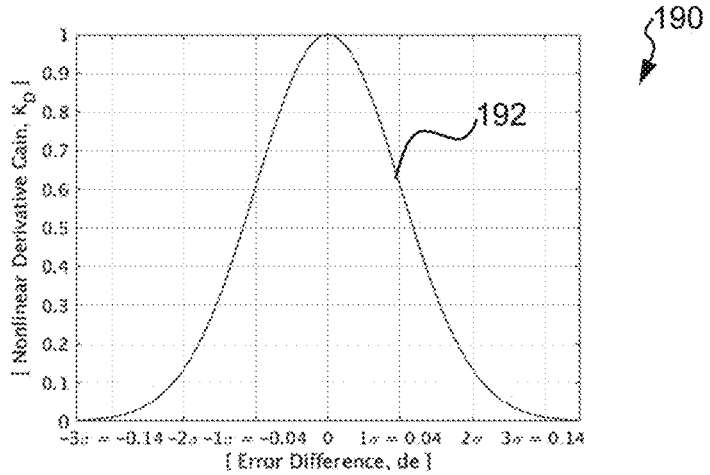
FIG. 8 is a graph illustrating a nonlinear derivative gain of an exemplary nonlinear derivative controller according to some embodiments.

The area under function f(x) indicates a probability of the occurrence of a certain range of deviation. Applying the probability f(x) of Equation (8) to the nonlinear derivative controller, the nonlinear derivative controller may be represented as an exponential term in the probability density function multiplied by the constant b. As an example, based on the observation of an exemplary aircraft movement, σ may be determined as 0.04, meaning the distance that the exemplary aircraft can move during 0.03 seconds (the update rate used in this example) has an approximately 68% chance of being within four centimeters (cm) and an approximately 95% percent of chance of being within eight cm. Referring briefly to FIG. 8, a graph 190 is shown indicating a nonlinear derivative gain $K_D$ of an exemplary nonlinear derivative controller 192 as a function of error difference de. In the example illustrated in graph 190, where b is 1 and μ is 0, the nonlinear derivative controller 192 may provide derivative gains as shown in graph 190.

Referring again to FIG. 6, in some embodiments, depending on the error difference de, the nonlinear derivative gain $K_D$ may be selected and multiplied by the derivative term $de(t_k)/dt_k$. If the estimated error difference is too high, then a relatively small nonlinear derivative gain $K_D$ may significantly minimize the control input from spurious error differences. In this manner, the nonlinear derivative controller may not respond to spurious error differences applied thereto and thereby provide smooth control over aircraft 100. Additionally, in some embodiments, the magnitude of the nonlinear derivative gain $K_D$ may vary according to the selection of constant b in Equation (8).

Figure 9:
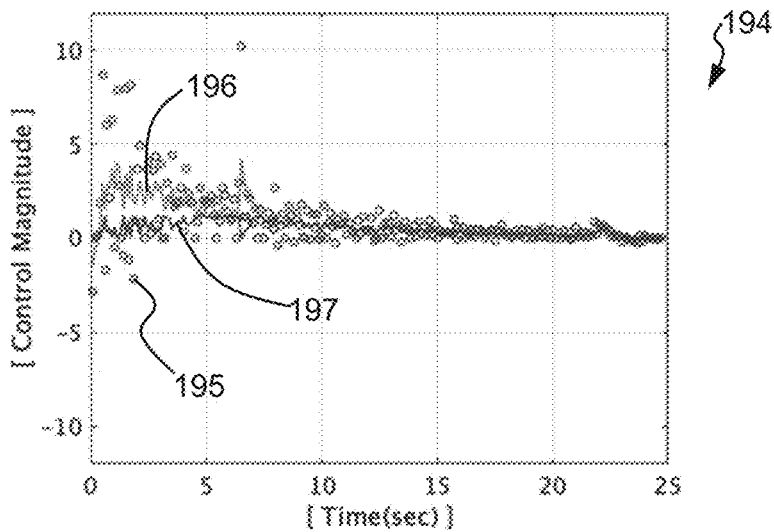
FIG. 9 is a graph illustrating a control magnitude of an exemplary probabilistic nonlinear controller according to some embodiments.

Referring briefly to FIG. 9, an exemplary graph 194 is shown of unitless control magnitude for various exemplary controllers as a function of time in seconds. Particularly, graph 194 illustrates the performance of an exemplary linear derivative controller 195 without a Kalman filter, an exemplary linear derivative controller 196 including a Kalman filter, and an exemplary probabilistic nonlinear controller 197 with a Kalman filter. As indicated in graph 194, relatively small position errors may lead to unstable control of the derivative controller 195 not including a Kalman filter. Additionally, while the linear derivative controller 196 including a Kalman filter outperforms controller 195, controller 196 still exhibits some instability from the position errors corresponding to the initial start time some of which may be spurious. In this example, the nonlinear controller 197 exhibits superior performance to linear derivative controller 196 and is substantially unaffected by spurious position errors applied thereto.

Figure 10:
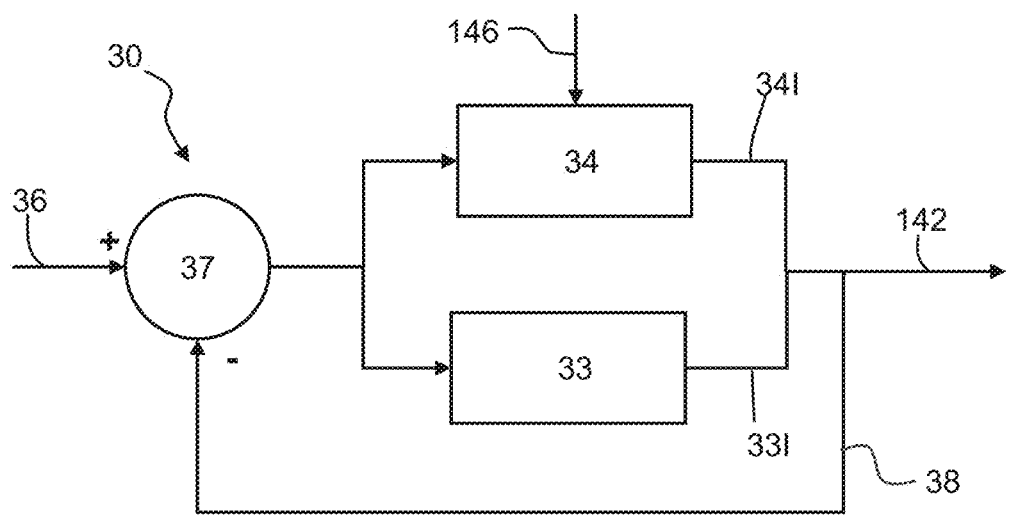
FIG. 10 is a block diagram of a control architecture of an outer-loop controller of the autonomous control system of FIG. 6 according to some embodiments.

Referring to FIGS. 6, 10, an exemplary architecture or control logic of the feedback control module 33 and reinforcement learning module 34 is shown in FIG. 10. Feedback control module 33 may achieve smooth, accurate control of aircraft 100 during vertical landing under ideal conditions. However, the environmental conditions such as wind speed, temperature, condensation, etc., to which aircraft 100 is exposed during operation may vary substantially. Reinforcement learning module 34 is generally configured to maximize the performance of outer-loop controller 30 in varying environment conditions. Reinforcement learning module 34 may adapt or adjust the control inputs 142 produced by outer-loop controller 30 based on the current environmental conditions to which aircraft 100 is exposed during flight.

In some embodiments, reinforcement learning module 34 may comprise a machine learning algorithm trained to control a vertical landing aircraft when the aircraft is exposed to one or more specific environmental conditions. For example, in a first training session, the machine learning algorithm may be trained to control the position and orientation of a vertical landing aircraft when the aircraft is exposed to a headwind of between ten and fifteen miles per hour (mph). In a second training session, the machine learning algorithm be trained to control the position and orientation of a vertical landing aircraft when the aircraft is exposed to a tailwind of between five and ten mph, and so on and so forth. In this manner, the machine learning algorithm of reinforcement learning module 34 may be trained to control a vertical landing aircraft across a range of environmental conditions, where the control inputs provided by reinforcement learning module 34 may vary in response to changes in the environmental conditions to which the aircraft is exposed.

In some embodiments, the machine learning algorithm of reinforcement learning module 34 may comprise a reinforcement learning algorithm such as, for example, a Twin Delayed Deep Deterministic Policy Gradient (DDPG) (TD3) reinforcement learning algorithm. For a given training session in which the algorithm guides a vertical landing aircraft from an initial position to a landing position at a target area, the reinforcement learning algorithm may be provided with a maximum reward for vertically landing the aircraft at the target area, and penalized or vertically landing the aircraft in areas outside of the target in proportion to the distance between the landing position of the aircraft and the target area. During a given training session, the reinforcement learning algorithm may estimate rewards for future actions in an effort to maximize the cumulative rewards received over the entire training session. This process may be repeated for a plurality of training sessions until the reinforcement learning algorithm learns an optimal control policy with respect to one or more specific environmental conditions whereby the rewards provided to the reinforcement learning algorithm are maximized.

As shown particularly in FIG. 10, in this embodiment, as aircraft 100 is piloted by autonomous control system 145, a setpoint 36 is supplied to a difference junction 37 along control input 142 as feedback 38 to be applied to the setpoint 36. As described above, setpoint 36 may be determined by object detection module 31 at relatively large distances, and by machine vision module 32 at relatively close distances. The difference between the setpoint 36 and control input feedback 38 may be applied to both the feedback control module 33 and reinforcement learning module 34. In addition, an environmental condition or disturbance input 146 may be applied to reinforcement learning module 34. The environmental condition input 146 may comprise information pertaining to the estimated current environmental conditions being experienced by the aircraft 100. For instance, environmental condition input 146 may comprise a wind speed and/or direction within the vicinity of aircraft 100. Environmental condition input 146 may be determined by one or more sensors onboard aircraft 100, and/or may be transmitted to aircraft 100 from surface vessel 20 or some other source.

Both the control feedback control module 33 and reinforcement learning module 34 may separately provide control inputs 331, 341, respectively, based on the difference between the setpoint 36 and control input feedback 38. The control input 341 provided by reinforcement learning module 34 is dependent on environmental condition input 146 while the control input 331 provided by control feedback module 33 is not dependent on environmental condition input 146. In some embodiments, the control inputs 142 provided by outer-loop controller 30 is based on both the control input 331 provided by control feedback module 33 and the control input 341 provided by reinforcement learning module 34. For example, reinforcement learning module 34 may adjust the control input 331 provided by control feedback module 33 based on a magnitude of an environmental disturbance applied to aircraft 100. The magnitude of the environmental disturbance may correspond to the magnitude of the environmental condition input 146. Thus, when no environmental disturbance is presently being applied against the aircraft 100, control inputs 142 may correspond to control inputs 331 provided by feedback control module 33. However, control inputs 142 may vary from control inputs 331 when the magnitude of the environmental disturbance is greater than zero such that reinforcement learning module 34 adjusts control inputs 331 to provide control inputs 142. The adjustment to control inputs 331 made by reinforcement learning module 34 may reduce variance and/or oscillations in the control input 331 provided by feedback control module 33 at relatively close distances to ensure stable, smooth control over aircraft 100 as aircraft 100 lands vertically onto landing pad 24 of surface vessel 20. In other embodiments, the architecture of outer-loop controller 30 may vary. For instance, outer-loop controller 30 may only include feedback control module 33 instead of the combination of feedback control module 33 and reinforcement learning module 34.

Figure 11:
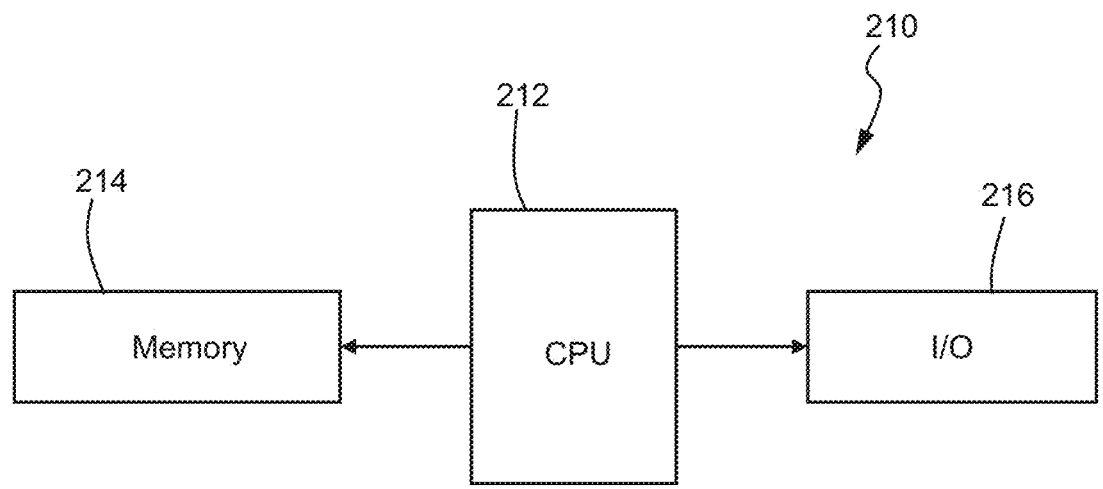
FIG. 11 is a block diagram of a computer system according to some embodiments.
Figure 12:
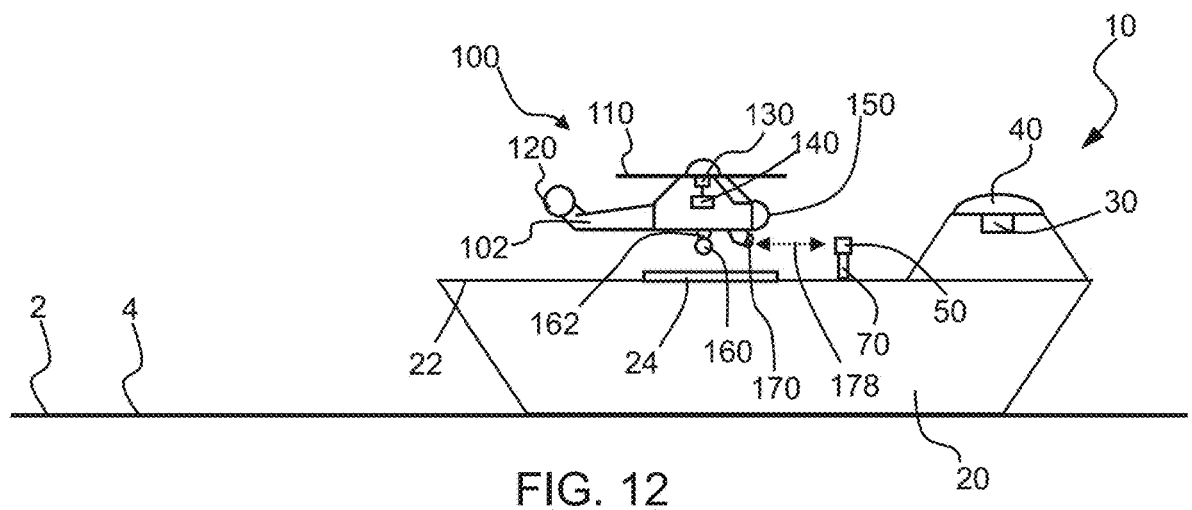
FIG. 12 is another schematic view of the system of FIGS. 1-3.

Referring to FIG. 11, an embodiment of a computer system 210 suitable for implementing one or more embodiments disclosed herein is shown. For example, components of system 10 shown in FIGS. 1-3 (e.g., outer-loop controller 30, inner-loop controller 140, etc.) may be configured in a manner similar to the computer system 210 shown in FIG. 11. For example, controllers 30, 140 may each be embodied in one or more separate computer systems 210 or may collectively be embodied in a single computer system 210. The computer system 210 includes a processor 212 (which may be referred to as a central processor unit or CPU) that is in communication with one or more memory devices 214, and input/output (I/O) devices 216. The processor 212 may be implemented as one or more CPU chips. The memory devices 214 of computer system 210 may include secondary storage (e.g., one or more disk drives, etc.), a non-volatile memory device such as read only memory (ROM), and a volatile memory device such as random access memory (RAM). In some contexts, the secondary storage ROM 216, and/or RAM comprising the memory devices 214 of computer system 210 may be referred to as a non-transitory computer readable medium or a computer readable storage media. I/O devices 216 may include printers, video monitors, liquid crystal displays (LCDs), touch screen displays, keyboards, keypads, switches, dials, mice, and/or other well-known input devices.

It is understood that by programming and/or loading executable instructions onto the computer system 210, at least one of the CPU 212, the memory devices 214 are changed, transforming the computer system 210 in part into a particular machine or apparatus having the novel functionality taught by the present disclosure. Additionally, after the computer system 210 is turned on or booted, the CPU 212 may execute a computer program or application. For example, the CPU 212 may execute software or firmware stored in the memory devices 214. During execution, an application may load instructions into the CPU 212, for example load some of the instructions of the application into a cache of the CPU 212. In some contexts, an application that is executed may be said to configure the CPU 212 to do something, e.g., to configure the CPU 212 to perform the function or functions promoted by the subject application. When the CPU 212 is configured in this way by the application, the CPU 212 becomes a specific purpose computer or a specific purpose machine.

Referring again to FIGS. 1-3, 12-14, having described the structural and functional configuration of the embodiment of system 10 shown in FIGS. 1-11, an exemplary description of the operation of system 10 will now be provided. In this exemplary embodiment, aircraft 100 may travel in the direction of surface vessel 20 based on a predefined, autonomous flight plan stored in one of controllers 30, 140. Aircraft 100 may approach surface vessel 20 in a generally forward direction (e.g., in the X-direction of global reference frame 5) at a low elevation similar to the elevation of visual cue 50. In other embodiments, aircraft 100 may be piloted by a human pilot in the forward direction towards surface vessel 20.

Autonomous control system 145 may be initiated as aircraft 100 approaches surface vessel 20. In some embodiments, autonomous control system 145 may be initiated automatically as part of the predefined flight plan. In other embodiments, autonomous control system 145 may be initiated by an operator of aircraft 100 such as a pilot aboard aircraft 100 or an operator of aircraft 100 located remotely from aircraft 100. Object detection module 31 of outer-loop controller 30 may initiate in response to the initiation of autonomous control system 145. Particularly, using image data 144 provided by onboard camera 170, object detection module 31 locates surface vessel 20 within the field of view 174 of onboard camera 170 once surface vessel 20 becomes distinguishable within the images corresponding to image data 144.

Once object detection module 31 has detected surface vessel 20 within image data 144, object detection module 31 provides a setpoint 36 (shown in FIG. 10) corresponding to the location of surface vessel 20. The setpoint 36 is applied to feedback controller module 33 and reinforcement learning module 34 which collaboratively provide a control input 142 for controlling the trajectory of aircraft 100. The tracking of surface vessel 20 generally may correspond to a long-distance tracking paradigm of autonomous control system 145. In the long-distance tracking paradigm, the control input 142 is configured to align the camera center 176 of onboard camera 170 with surface vessel 20 as aircraft 100 travels towards surface vessel 20, as shown particularly in FIG. 2. In this manner, modules 33, 34 reduce or minimize an error between the position of camera center 176 and the position of surface vessel 20 in the image data 144 captured by onboard camera 170.

As aircraft 100 approaches surface vessel 20, visual cue 50 becomes distinguishable in the image data 144 provided by onboard camera 170. In this exemplary embodiment, object detection module 31 of outer-loop controller 30, in response to visual cue 50 becoming distinguishable in image data 144, provides a setpoint 36 corresponding to the visual cue 50. The tracking of visual cue 50 corresponds to a medium or intermediate-distance tracking paradigm of autonomous control system 145. In the intermediate-distance tracking paradigm, the control input 142 is configured to align the camera center 176 of onboard camera 170 with visual cue 50, as shown particularly in FIG. 3. In this manner, modules 33, 34 reduce or minimize an error between the position of camera center 176 and the position of visual cue 50 in the image data 144 captured by onboard camera 170.

As aircraft 100 approaches visual cue 50 of surface vessel 20, the visual indicator 54, including corners 58, of visual cue 50 becomes distinguishable in the image data 144 provided by onboard camera 170. In this exemplary embodiment, in response to visual indicator 50 of visual cue 50 becoming distinguishable in image data 144, machine vision module 32, rather than object detection module 31, provides a setpoint 36 corresponding to a center or origin of the visual indicator 54 of visual cue 50. The tracking of visual indicator 54 by machine vision module 32 may correspond to a near-distance tracking paradigm of autonomous control system 145. In the near-distance tracking paradigm, the control input 142 is configured to dispose and orient aircraft 100 into a predefined, hovering landing position 178 that is fixed relative to the visual indicator 54 of visual cue 50, as shown particularly in FIG. 12. The landing position 178 may be positioned vertically above the landing pad 24 of surface vessel 20. In some embodiments, landing position 178 is vertically and sideways aligned (e.g., in the Y- and Z-directions of global reference frame 5) with visual indicator 54 such that landing position 178 is only offset from visual indicator 54 in the forward direction (e.g., in the X-direction of global reference frame 5) by a predefined distance.

Machine vision module 32 may determine both the distance of aircraft 100 from visual indicator 54 in each orthogonal direction (e.g., the X, Y, and Z-directions of global reference frame 5) as well as the orientation of aircraft 100 relative visual indicator 54 with respect to each orthogonal axis (e.g., the X, Y, and Z-directions of global reference frame 5). Particularly, machine vision module 32 may determine the position and orientation of aircraft 100 relative to visual cue 50 by identifying the relative distance between onboard camera 170 and each of the corners 58 of the visual indicator 54. In doing so, machine vision module 32 may also determine the position and orientation of aircraft 100 relative to landing position 178 given the predefined offset between landing position 178 and visual cue 50 known by autonomous landing system 145. In this manner, machine vision module 32, acting through control feedback module 33 and reinforcement learning module 34, may dispose aircraft 100 in both a predefined position and a predefined orientation relative to the visual indicator 54 of visual cue 50 and which corresponds to the landing position 178.

Figure 13:
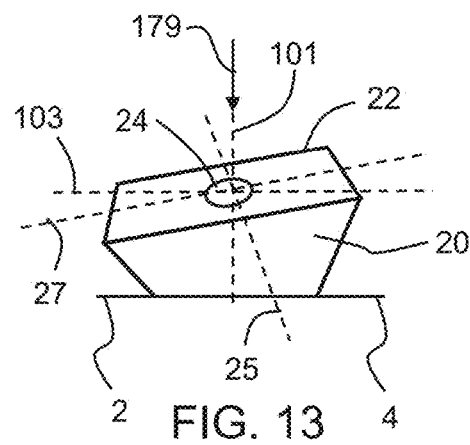
FIG. 13 is a schematic view of a landing platform of the system of FIGS. 1-3 according to some embodiments.

As shown particularly in FIG. 13, given that aircraft 100 is controlled based on the motion-stabilized position of the visual indicator 54 of visual cue 50, when approaching and entering the landing position 178, the roll and pitch axes 101, 103, respectively, of aircraft 100 may remain stationary with respect to the global reference frame 5 and horizon 4 as platform 22 of surface vessel 20 rolls and pitches about roll and pitch axes 25, 27, respectively, of platform 22. Tracking the motion-stabilized position of visual indicator 54 of visual cue 50 thus allows for smooth and stable control of aircraft 100 as aircraft 100 is transported to the landing position 178.

Figure 14:
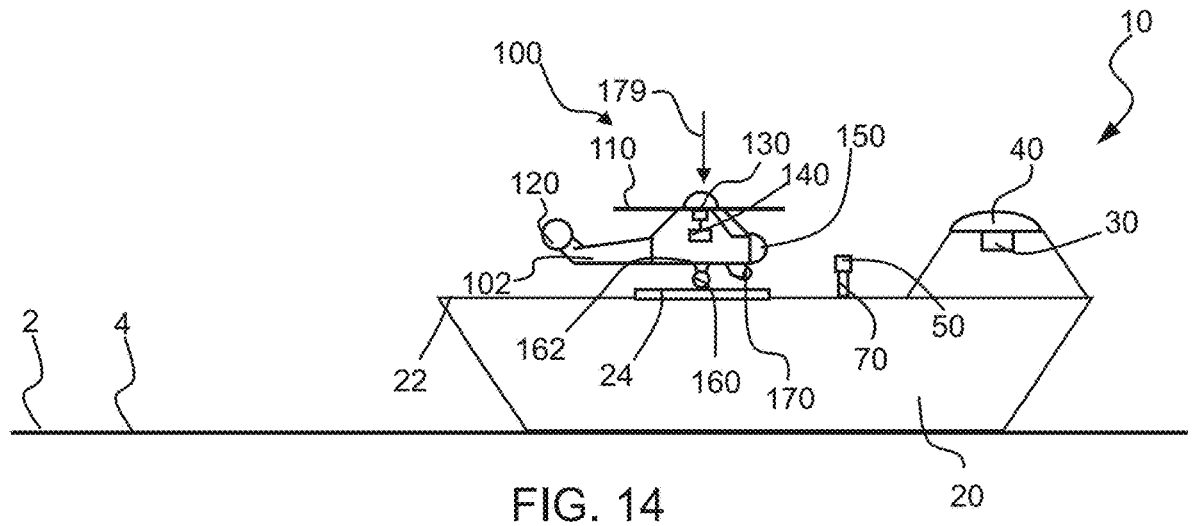
FIG. 14 is another schematic view of the system of FIGS. 1-3.

In this exemplary embodiment, once aircraft 100 enters the landing position 178, autonomous control system 145 reduces the vertical thrust provided by primary rotor assembly 110 of aircraft 100 to vertically drop (e.g., in the Y-direction of global reference frame 5) (indicated by arrow 179 in FIGS. 13, 14) aircraft 100 from the landing position 178 to the landing pad 24 of surface vessel 20 positioned beneath position 178 to complete the vertical landing of aircraft 100, as shown particularly in FIG. 14. As aircraft 100 drops from the landing position 178, aircraft 100 may be oriented at an angle (e.g., about roll and/or pitch axes 101, 103) relative to the landing pad 24 given that the aircraft 100 is not controlled to match the movement of landing pad 24 which may be moving erratically due to wind, heave forces, and/or other forces applied to surface vessel 20. However, the suspension system 162 of aircraft 100 may account for offset in roll and/or pitch between aircraft 100 and landing pad 24 to ensure the safe landing of aircraft 100 onto the landing pad 24 of surface vessel 20.

Figure 15:
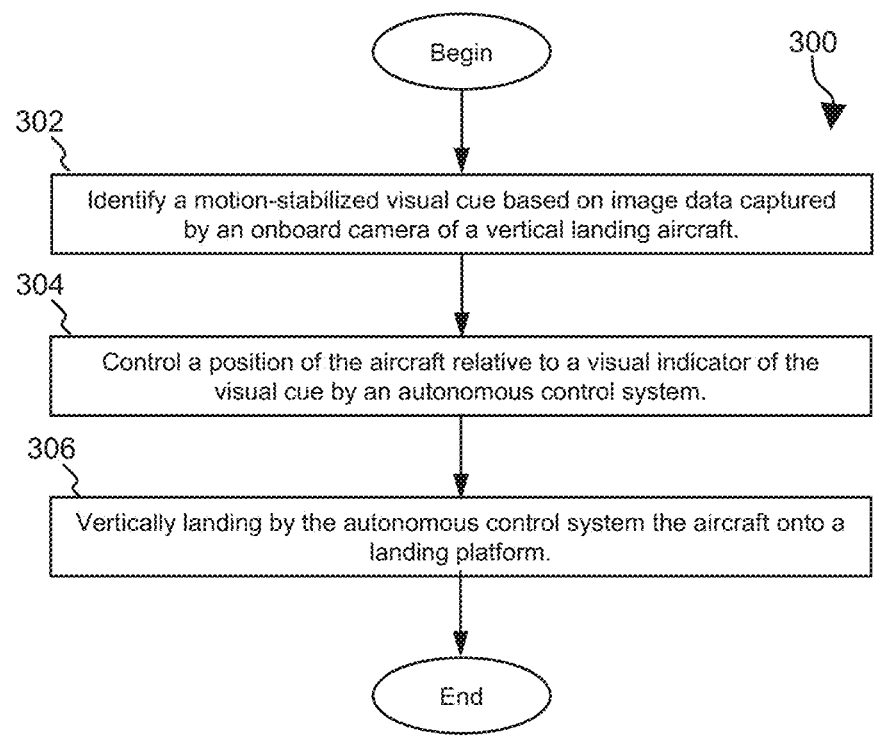
FIG. 15 is a flowchart of a method for autonomously landing a vertical landing aircraft according to some embodiments.

Referring to FIG. 15, a method 300 for autonomously landing a vertical landing aircraft is shown. Initially, block 302 of method 300 comprises identifying a landing platform based on image data captured by an onboard camera of a vertical landing aircraft. In some embodiments, block 302 comprises identifying surface vessel 20 shown in FIGS. 1-3, 12-14 using the object detection module 31 of the outer-loop controller 30 shown particularly in FIGS. 6, 10. In other embodiments, the landing platform may comprise other types of offshore structures or land-based structures. Block 304 of method 30 comprises controlling a position of the aircraft relative to the landing platform by an autonomous control system. In some embodiments, block 304 comprises controlling a position of aircraft 100 relative to the surface vessel 20 by autonomous control system 145 shown particularly in FIG. 6. For example, the feedback control module 33, with or without the assistance of reinforcement learning module 34, of outer-loop controller 30 may control the position of aircraft 100 based on a setpoint corresponding to an object comprising the surface vessel 20. The outer-loop controller 30 may also control aircraft 100 whereby an area within a field of view 174 of the onboard camera 170 occupied by the object is increased.

Block 306 of method 300 comprises identifying a motion-stabilized visual cue based on the image data captured by the onboard camera of the vertical landing aircraft, wherein the visual cue is configured to maintain a fixed orientation of the visual indicator relative to a horizon. In some embodiments, block 306 comprises identifying the visual indicator 54 of visual cue 50 shown in FIG. 4 by the machine vision module 32 of the outer-loop controller 30 of autonomous control system 145.

Block 308 of method 300 comprises controlling a position of the aircraft relative to a visual indicator of the visual cue by an autonomous control system. In some embodiments, block 308 comprises controlling the position of aircraft 100 shown in FIGS. 1-3, 12, and 14 relative to the visual indicator 54 of visual cue 50 by the autonomous control system 145. Block 310 of method 300 comprises vertically landing by the autonomous control system the aircraft onto a landing platform. In some embodiments, block 310 comprises vertically landing aircraft 100 by the autonomous control system 145 onto the landing pad 24 of surface vessel 20.

While embodiments of the disclosure have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. An autonomous landing system for landing a vertical landing aircraft on a landing platform, comprising:
   a vertical landing aircraft comprising a powertrain and an onboard camera;
   a visual cue motion-stabilized relative to the landing platform and comprising a visual indicator located on a horizontally extending surface of the visual cue whereby the visual indicator extends vertically across a horizon, wherein the visual cue is configured to maintain a fixed orientation of the visual indicator with respect to the horizon; and
   an autonomous control system configured to:
   control a position of the aircraft with respect to the visual indicator of the visual cue to maneuver the aircraft into a hovering, predefined landing position vertically above the landing platform, the predefined landing position being horizontally spaced from the visual indicator and horizontally aligned with the landing platform; and
   reduce a vertical thrust generated by the powertrain in response to the aircraft entering the landing position to cause the aircraft to descend vertically from the landing position and land on the landing platform at a location that is spaced from the visual cue based on image data captured by the onboard camera.

2. The system of claim 1, wherein the autonomous control system comprises an object detection module trained to visually identify the landing platform based on the image data captured by the onboard camera.

3. The system of claim 1, wherein the autonomous control system comprises a machine vision module configured to determine a position and an orientation of the aircraft relative to the visual indicator based on the image data captured by the onboard camera.

4. The system of claim 1, wherein the autonomous control system comprises a feedback control module configured to reduce an error between a center of the onboard camera and a setpoint and to increase an area within a field of view of the camera of an object corresponding to the setpoint, wherein the object comprises one of the visual cue and the landing platform.

5. The system of claim 4, wherein the setpoint is provided by either an object detection module of the autonomous control system configured to detect the landing platform, or a machine vision module of the autonomous control system configured to identify the visual indicator.

6. The system of claim 1, wherein the autonomous control system comprises:
 a feedback control module configured to provide a control input to reduce an error between a center of the onboard camera and a setpoint and to increase an area within a field of view of the onboard camera of an object corresponding to the setpoint, wherein the object comprises one of the visual cue and the landing platform; and
 a reinforcement learning module configured to adjust the control input based on a magnitude of an environmental disturbance applied to the aircraft.

7. The system of claim 6, wherein the magnitude of the environmental disturbance comprises a wind speed.

8. The system of claim 6, wherein the feedback control module comprises a nonlinear controller which comprises a nonlinear gain based on a probability density function.

9. The system of claim 1, wherein the control system is configured to maintain the aircraft in a predefined angular orientation corresponding to the fixed orientation of the visual indicator as the landing platform rotates relative to the visual indicator.

10. A method for autonomously landing a vertical landing aircraft on a landing platform, comprising:
 (a) identifying a visual indicator based on image data captured by an onboard camera of the aircraft, wherein the visual indicator is located on a horizontally extending surface of the visual cue whereby the visual indicator extends vertically across a horizon, and wherein the visual cue is motion-stabilized relative to the landing platform and configured to maintain a fixed orientation of a visual indicator of the visual cue relative to the horizon;
 (b) controlling a position of the aircraft relative to the visual indicator by an autonomous control system to maneuver the aircraft into a predefined landing position vertically above the landing platform, the predefined landing position being horizontally spaced from the visual indicator and horizontally aligned with the landing platform; and
 (c) reducing by the control system a vertical thrust generated by a powertrain of the aircraft in response to the aircraft entering the landing position to cause the aircraft to descend vertically from the landing position and land onto the landing platform at a location that is spaced from the visual cue.

11. The method of claim 10, further comprising:
 (d) detecting the landing platform by an object detection module trained to identify the landing platform; and
 (e) autonomously controlling the position of the aircraft so as to reduce an error between a center of the onboard camera and a setpoint determined by the object detection module, and increase an area within a field of view of the onboard camera occupied by an object corresponding to the setpoint, wherein the object comprises one of the landing platform and the visual cue.

12. The method of claim 10, further comprising:
 (d) providing a control input by a feedback control module to reduce an error between a center of the onboard camera and a setpoint and to increase an area within a field of view of the onboard camera of an object corresponding to the setpoint, wherein the object comprises one of the landing platform and the visual cue; and
 (e) adjusting the control input by a reinforcement learning module based on a magnitude of an environmental disturbance applied to the aircraft.

13. An autonomous landing system for landing a vertical landing aircraft on a landing platform, the system comprising:
 a processor;
 a storage device coupled to the processor and containing instructions that when executed cause the processor to:
  control a position of the aircraft relative to a visual indicator of a visual cue motion-stabilized relative to the landing platform to maneuver the aircraft into a predefined landing position vertically above the landing platform the predefined landing position being horizontally spaced from the visual indicator and horizontally aligned with the landing platform, wherein the visual indicator is located on a horizontally extending surface of the visual cue whereby the visual indicator extends vertically across a horizon; and
  reduce a vertical thrust generated by a powertrain of the aircraft in response to the aircraft entering the landing position to cause the aircraft to descend vertically from the landing position and land on the landing platform at a location that is spaced from the visual cue based on image data captured by an onboard camera of the aircraft, wherein the visual cue is configured to maintain a fixed orientation of the visual indicator with respect to the horizon.

14. The system of claim 13, wherein the instructions when executed cause the processor to visually identify by an object detection module the landing platform based on the image data captured by the onboard camera.

15. The system of claim 13, wherein the instructions when executed cause the processor to determine by a machine vision module a position and an orientation of the aircraft relative to the visual indicator based on the image data captured by the onboard camera.

16. The system of claim 13, wherein the instructions when executed cause the processor to reduce by a feedback control module an error between a center of the onboard camera and a setpoint corresponding to at least one of the visual cue and the landing platform.

17. The system of claim 16, wherein the setpoint is provided by either an object detection module configured to detect the landing platform, or a machine vision module configured to identify the visual indicator.

18. The system of claim 13, wherein the instructions when executed cause the processor to:
 provide a control input by a feedback control module to reduce an error between a center of the onboard camera and a setpoint and to increase an area within a field of view of the onboard camera of an object corresponding to the setpoint, wherein the object comprises one of the visual cue and the landing platform; and adjust the control input by a reinforcement learning module based on a magnitude of an environmental disturbance applied to the aircraft.

19. The system of claim 18, wherein the magnitude of the environmental disturbance comprises a wind speed.

20. The system of claim 18, wherein the feedback control module comprises a nonlinear controller which comprises a nonlinear gain based on a probability density function.

* * * * *